United States Patent
Ichiyanagi et al.

(10) Patent No.: US 7,548,182 B2
(45) Date of Patent: Jun. 16, 2009

(54) RADAR DEVICE AND RADAR METHOD

(75) Inventors: Hoshibumi Ichiyanagi, Nara (JP); Shinya Takenouchi, Otsu (JP); Yasuhiro Satoh, Otsu (JP); Hiroyuki Numata, Nara (JP)

(73) Assignee: OMRON Corporation, Kyoto (JP)

( * ) Notice: Subject to any disclaimer, the term of this patent is extended or adjusted under 35 U.S.C. 154(b) by 150 days.

(21) Appl. No.: 11/726,851

(22) Filed: Mar. 23, 2007

(65) Prior Publication Data

US 2008/0030399 A1 Feb. 7, 2008

(30) Foreign Application Priority Data

Mar. 23, 2006 (JP) .............................. 2006-081261

(51) Int. Cl.
*G01S 13/93* (2006.01)
(52) U.S. Cl. .............................. 342/27; 342/70; 342/91
(58) Field of Classification Search .................. 342/27, 342/70–72, 89–94
See application file for complete search history.

(56) References Cited

U.S. PATENT DOCUMENTS

| | | | |
|---|---|---|---|
| 3,965,475 A | | 6/1976 | Deerkoski et al. |
| 5,657,024 A | * | 8/1997 | Shingyoji et al. .......... 342/175 |
| 6,937,183 B2 | * | 8/2005 | Nishiguchi et al. ............ 342/28 |
| 7,227,493 B2 | * | 6/2007 | Oswald et al. ................ 342/70 |
| 7,468,791 B2 | * | 12/2008 | Samukawa et al. ......... 356/325 |
| 7,489,265 B2 | * | 2/2009 | Egri et al. ..................... 342/70 |
| 2003/0210172 A1 | * | 11/2003 | Pleva et al. ................... 342/70 |
| 2004/0119633 A1 | * | 6/2004 | Oswald et al. ................ 342/70 |
| 2004/0257266 A1 | * | 12/2004 | Pleva et al. ................... 342/70 |
| 2006/0119473 A1 | * | 6/2006 | Gunderson et al. .......... 340/435 |
| 2008/0030399 A1 | * | 2/2008 | Ichiyanagi et al. .......... 342/149 |
| 2008/0291078 A1 | * | 11/2008 | Hilsebecher et al. .......... 342/70 |
| 2008/0297400 A1 | * | 12/2008 | Hansen et al. ................ 342/70 |

FOREIGN PATENT DOCUMENTS

| | | |
|---|---|---|
| EP | 0 965 859 A1 | 12/1999 |
| EP | 0 969 548 A2 | 1/2000 |
| EP | 0 980 008 A2 | 2/2000 |
| EP | 1 321 776 A1 | 6/2003 |
| EP | 1 548 458 A2 | 6/2005 |
| EP | 1 684 092 A1 | 7/2006 |
| GB | 2 253 758 A | 9/1992 |
| JP | 2002-267750 A | 9/2002 |
| WO | 2004/061475 A1 | 7/2004 |
| WO | 2005/069905 A2 | 8/2005 |
| WO | 2006/066781 A2 | 6/2006 |

OTHER PUBLICATIONS

European Search Report issued in European Application No. EP 07 10 4685 mailed on Jul. 3, 2007, 12 pages.

* cited by examiner

*Primary Examiner*—John B Sotomayor
(74) *Attorney, Agent, or Firm*—Osha • Liang LLP

(57) ABSTRACT

A radar device for detecting an object in front of the radar device, has a plurality of antennas, wherein the object is detected based on each reception signal received by two or more of the plurality of antennas, a position specification section for specifying a position of the object by using each reception signal received by the two or more of the plurality of antennas; and an object detection section for confirming an existence of the object if the position specified by the position specification section is in a predetermined range.

6 Claims, 10 Drawing Sheets

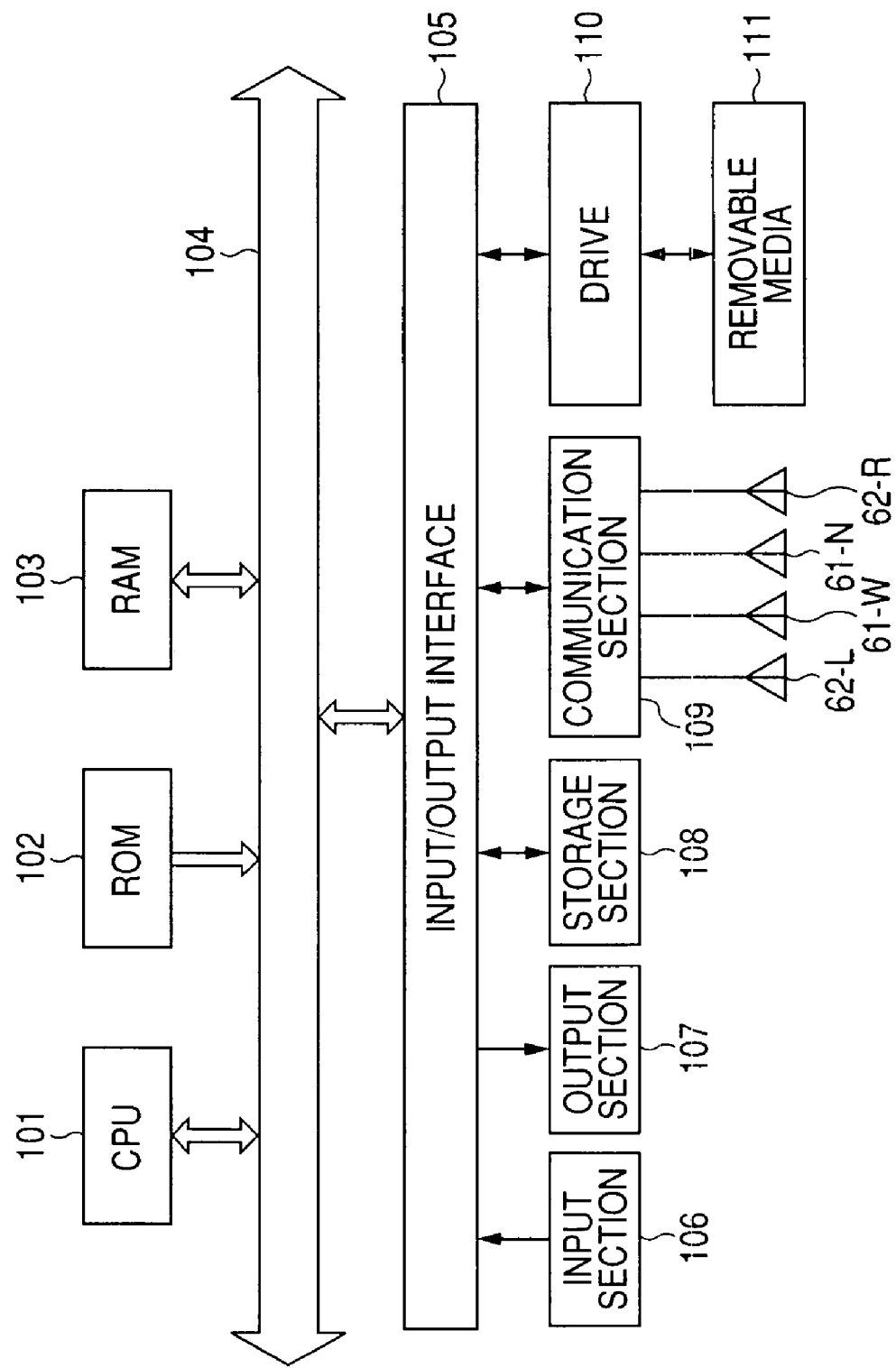

RADAR DEVICE AND RADAR METHOD

BACKGROUND OF THE INVENTION

1. Field of the Invention

The present invention relates to a radar device and a radar method, and relates specifically to a radar device and a radar method for accurate detection of an object in front of the radar.

2. Description of the Related Art

Monopulse type radars mounted to a vehicle can be used to avoid a collision between vehicle and other vehicle, with the radar detecting the other vehicles having possibility of a collision (for example, refer to JP-A-2002-267750).

The monopulse type means one system performing an angle detection. That is, the monopulse type radar detects an angle of a detection object with respect to a front center direction of itself. In other words, in a case where the monopulse type radar is mounted in a front portion of the vehicle, the other vehicle in the front of the vehicle becomes the detection object, and the angle of the other vehicle in the front of the vehicle is detected by the monopulse type radar. On the other hand, in a case where the monopulse type radar is mounted in a rear portion of the vehicle, the other vehicle in a rear of the vehicle becomes the detection object, and the angle of the other vehicle in the rear of the vehicle is detected by the monopulse type radar.

Hereunder, there is additionally explained about the monopulse type by referring to FIG. 1 to FIG. 4.

As shown in FIG. 1, in a conventional monopulse type radar 1, there is provided a transmitting antenna 11, and receiving antennas 12-L, 12-R are provided respectively in left and right sides of the transmitting antenna 11.

A transmission signal Ss is transmitted from the transmitting antenna 11.

This transmission signal Ss reflects in a detection object 2, and its reflection signal is received to the left receiving antenna 12-L as a reception signal Srl and received to the right receiving antenna 12-R as a reception signal Srr.

Thereupon, the monopulse type radar 1 calculates an angle θ of the detection object 2 by utilizing the reception signal Srl and the reception signal Srr by the monopulse type.

In this case, additionally the monopulse type can be divided broadly into a phase monopulse type and an amplitude monopulse type.

The phase monopulse type means the following system.

That is, as shown in FIG. 1, since a distance between the detection object 2 and the left receiving antenna 12-L differs from a distance between the detection object 2 and the right receiving antenna 12-R, it follows that a phase difference Δφ occurs between the reception signal Srl and the reception signal Srr. In this case, if a distance between the two receiving antennas 12-L, 12-R is described as d, the angle θ of the detection object 2 is shown like the following expression (1).

$$\Delta\phi = (2\pi d/\lambda)\sin\theta \quad (1)$$

In the expression (1), λ denotes a wavelength of the reception signals Srl, Srr.

Accordingly, the monopulse type radar 1 detects the phase difference Δφ between the reception signal Srl and the reception signal Srr, and calculates the angle θ of the detection object 2 on the basis of that phase difference Δφ and the expression (1).

The system like this is the phase monopulse type.

On the other hand, the amplitude monopulse type mentions the following system.

That is, a directivity DL of the left receiving antenna 12-L and a directivity Dr of the right receiving antenna 12-R are distributed like gain characteristics of FIG. 2 for instance. In this case, a signal intensity by an addition signal of the reception signal Srl of the left receiving antenna 12-L and the reception signal Srr of the right receiving antenna 12-R and a signal intensity by a difference signal between the reception signal Srl and the reception signal Srr become respectively like a curve Sadd and a curve Sdif shown by gain characteristics of FIG. 3, respectively. Additionally, a ratio between the signal intensities of both of the addition signal and the difference signal becomes like a curve R1 shown by a gain characteristic of FIG. 4.

Accordingly, the monopulse type radar 1 forms, by utilizing the reception signal Srl of the left receiving antenna 12-L and the reception signal Srr of the right receiving antenna 12-R, each of their addition signal and difference signal to thereby operate the ratio between the signal intensities of both of the addition signal and the difference signal, and calculates the angle θ of the detection object 2 by comparing an operation result thereof and a data of the gain characteristic of FIG. 4, which has been previously held.

The system like this is the amplitude monopulse type.

However, as shown in FIG. 5, in the conventional monopulse type radar 1, in such a case that, besides the detection object 2 exists in a front-left, a detection object 3 additionally exists in a front-right, an angle near 0 degree is detected as the angle θ. As a result, there has been a problem that, notwithstanding the fact that nothing actually exists near a front center direction, the conventional monopulse type radar 1 detects as if a detection object 4 exists near the front center direction, i.e., detects the detection object 4 which is merely a phantom.

Generation factors of this problem are as follows. That is, as shown in FIG. 5, in the left receiving antenna 12-L, it follows that a reflection signal of a transmission signal Ss2 in the detection object 2 is received as a reception signal Sr2*l*, and a reflection signal of a transmission signal Ss3 in the detection object 3 is received as a reception signal Sr3*l*. Similarly, in the right receiving antenna 12-R, it follows that the reflection signal of the transmission signal Ss2 in the detection object 2 is received as a reception signal Sr2*r*, and the reflection signal of the transmission signal Ss3 in the detection object 3 is received as a reception signal Sr3*r*. Accordingly, for the conventional monopulse type radar 1, by utilizing a mixed signal of the reception signal Sr2*l* and the reception signal Sr3*l* as a reception signal of the left receiving antenna 12-L, and a mixed signal of the reception signal Sr2*r* and the reception signal Sr3*r* as a reception signal of the right receiving antenna 12-R, respectively, the detection of the angle is performed. By this, it follows that the above-mentioned problem generates.

In this case, when a relative velocity v1 of the detection object 2 and a relative velocity v2 of the detection object 3, which are with respect to the monopulse type sensor 1, are different, due to Doppler effect it follows that frequencies of the reception signal Sr2*l* and the reception signal Sr3*l* are different respectively, and further it follows that frequencies of the reception signal Sr2*r* and the reception signal Sr3*r* are different respectively. Accordingly, if it is a monopulse type sensor capable of detecting a frequency (hereafter, referred to as a Doppler frequency), a phase and the like of a Doppler signal, e.g., a monopulse type sensor (refer to JP-A-2002-267750) in which a two-frequency CW system has been adopted, since a distinction between the reception signal Sr2*l* and the reception signal Sr3*l* can be made and further a distinction between the reception signal Sr2*r* and the reception signal Sr3*r* can be made, it is possible to solve the above-mentioned problem.

However, when the relative velocity v1 of the detection object 2 and the relative velocity v2 of the detection object 3 are the same, the Doppler frequency does not generate. That is, frequencies of the reception signal Sr2*l* and the reception signal Sr3*l* become the same, and further frequencies of the reception signal Sr2*r* and the reception signal Sr3*r* become the same. Accordingly, even if it is the monopulse type sensor in which the two-frequency CW system has been adopted, the distinction between the reception signal Sr2*l* and the reception signal Sr3*l* becomes impossible, and further the distinction between the reception signal Sr2*r* and the reception signal Sr3*r* becomes impossible. Thus, the above-mentioned problem still exists.

In other words, in the conventional monopulse type sensor, when the detection object near the front center direction has been detected, it is impossible to accurately specify whether that detection is a correct detection because the detection object in the front actually exists, or an error detection due to objects to the front-left and front-right of the radar.

SUMMARY OF THE INVENTION

In one or more embodiments of the present invention, when an object in front of the radar has been detected, to accurately specify whether that detection is a correct detection from the object actually existing, or an error detection caused by objects to the front-left and front-right of the radar.

In one or more embodiments of the present invention, a radar device for detecting an object in front of the radar device comprises a plurality of antennas, a position specification means, and an object detection means. The object is detected based on each reception signal received by two or more of the plurality of antennas. A position specification means specifies a position of the object by using each reception signal received by the two or more of the plurality of antennas. An object detection means confirms an existence of the object if the position specified by the position specification means is in a predetermined range. Thus, when the detection object in front of the radar has been detected, i.e., when it is judged that there is a possibility that a detection object exists, whether the detection is the correct detection because the object in the front actually exists, or the error detection due to objects to the front-left and front-right of the radar, can be accurately determined.

In one or more embodiments of the present invention, the plural antennas comprise an antenna mounted to the monopulse type sensor.

In one or more embodiments of the present invention, each of the position specification means and the object detection means comprise a circuit performing a signal processing, and a computer implementing signal processing software. In one or more embodiments of the present invention, other elements, e.g., an antenna for receiving a signal becoming an object of the signal processing, a camera or sensor outputting the signal becoming the object of the signal processing, etc, may also be included.

In one or more embodiments of the present invention, the object detection means has a narrow angle transmission means which, when the position having specified by the position specification means is in the predetermined range, transmits a second transmission signal with a directivity of narrower angle than a first transmission signal corresponding to the reception signal used in the position specification means, and a confirmation means for confirming the existence of the object on the basis of a reflection signal generated by the second transmission signal from the narrow angle transmission means being reflected by the object.

In one or more embodiments of the present invention, the plural antennas comprise a first antenna transmitting the first transmission signal, and a second antenna as the narrow angle transmission means transmitting the second transmission signal.

In one or more embodiments of the present invention, the position specification means operates an angle by a monopulse type and, on the basis of the angle, specifies the position of the object, and the confirmation means operates an angle by a predetermined system using each reception signal when the reflection signal generated by the second transmission signal being reflected by the object has been received by each of the two or more antennas and, based on a result of that operation, confirms the existence of the object. Thus, one part of a conventional monopulse type sensor can be diverted, and the radar device can be easily realized.

In one or more embodiments of the present invention, the radar device comprises a switching means which switches, when the position specified by the position specification means is in the predetermined range, an antenna for transmission to the second transmitting antenna, and which switches, after a confirmation of the existence of the object by the confirmation means has finished, the antenna for transmission to the first transmitting antenna. Thus, at a specification time of the position of the object by the position specification means, the first transmitting antenna is certainly utilized and, at a confirmation time of the object by the confirmation means, the second transmitting antenna is certainly utilized.

In one or more embodiments of the present invention, the switching means is comprises a switch circuit of one-input and two-output.

In one or more embodiments of the present invention, the radar device comprises a velocity-distance operation means operating at least one of a relative velocity to and a relative distance from the detection object by using at least one part within the each reception signal received by the two or more antennas, and the position specification means specifies the position of the object by using at least one part within an operation result of the velocity-distance operation means, and the confirmation means confirms the existence of the object by using at least one part within the operation result of the velocity--distance operation means. Thus, since a judgment material capable of being utilized for the specification of the position of the object by the specification means and the confirmation of the object by the confirmation means are increased, the detection of the object can be done more accurately.

In one or more embodiments of the present invention, a detection method in a radar device comprising a plurality of antennas, wherein an object in front of the radar device is detected based on a reception signal received by two or more antennas of the plurality of antennas, comprises the steps of specifying a position of the object by using reception signals received by each of the two or more antennas, and confirming an existence of the object when the specified position is in a predetermined range. Thus, when the detection object in the front has been detected, i.e., when there has been judged that there is the existence possibility of the detection object, it becomes possible to accurately specify whether that detection is the correct detection because the object in the front actually exists, or the error detection due to objects to the front-left and front-right of the radar.

A radar device according to one or more embodiments of the present invention accurately detects an object in front of the radar. The radar device according to one or more embodiments of the present invention is able reduce error detection. When the object in front of the radar device has been detected, i.e., when the radar device judges that there is a possibility of an existence of the object, it is possible to accurately specify whether that detection is a correct detection because the object in the front actually exists, or an error detection due to objects to the front-left and front-right of the radar.

BRIEF DESCRIPTION OF THE DRAWINGS

FIG. 11 is a block diagram showing other example of a hardware constitution of all or one portion of the monopulse type radar to which one or more embodiments of the present invention is applied.

DETAILED DESCRIPTION

Exemplary embodiments of the invention will be described with reference to the accompanying figures. Like items in the figures are shown with the same reference numbers.

In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 6:
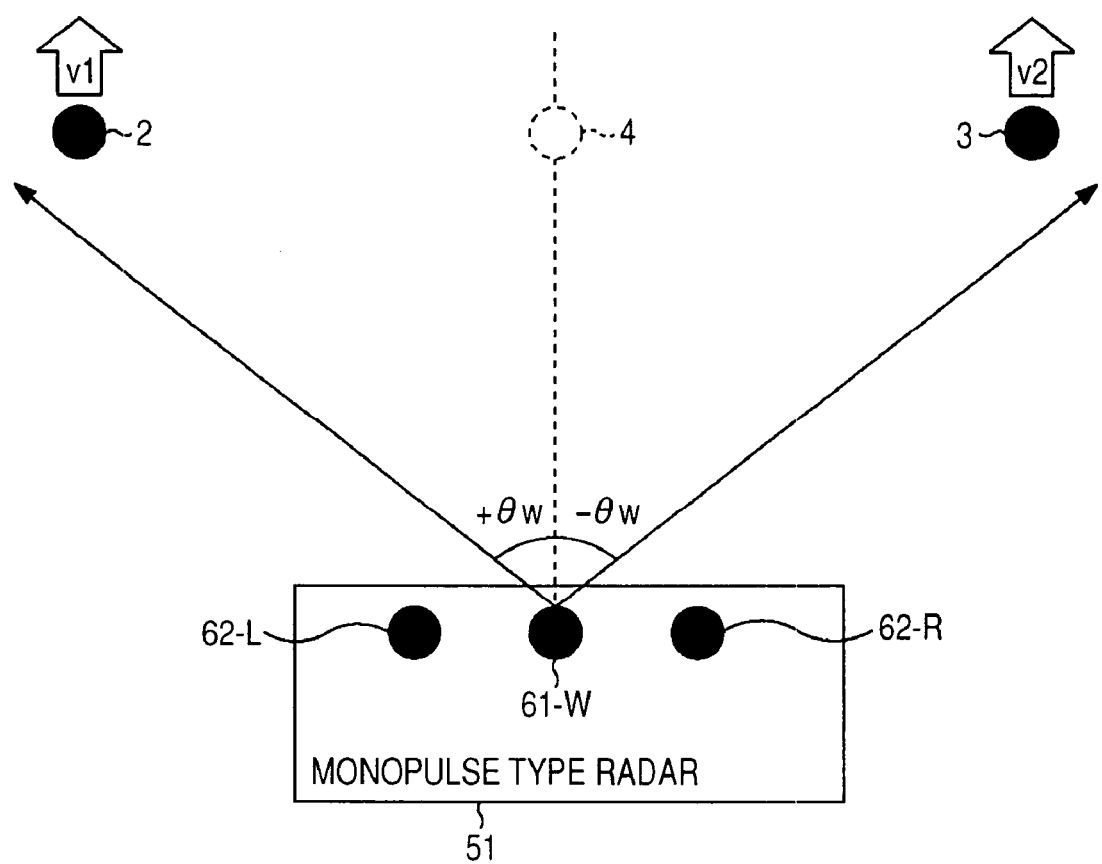
FIG. 6 is a view explaining a technique to which one or more embodiments of the present invention is applied.
Figure 7:
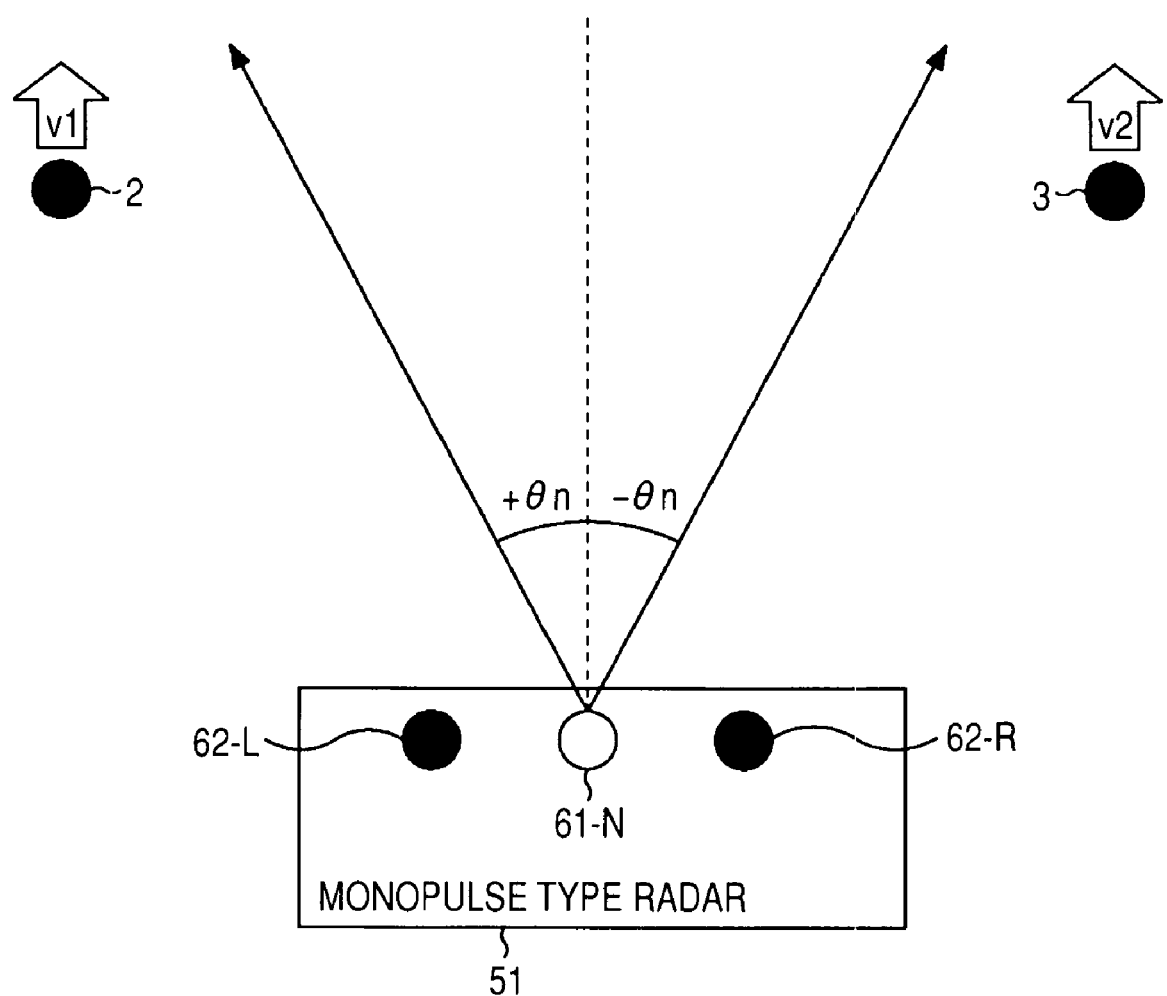
FIG. 7 is a view explaining the technique to which one or more embodiments of the present invention is applied.

At the outset, a radar device according to one or more embodiments of the present invention is explained by referring to FIG. 6 and FIG. 7.

In one or more embodiments of the invention explained here, an assumption is made to perform, by the monopulse type, the detection of the detection object near the front center direction. Such a detection is implemented by a monopulse type radar 51 shown in FIG. 6 and FIG. 7.

Incidentally, the front mentioned here indicates a front for the monopulse type radar 51, i.e., an upper direction in the drawings of FIG. 6 and FIG. 7. However, if there is noted to the vehicle to which the monopulse type radar 51 is mounted, as having been mentioned above in the "Background Art", the front mentioned here becomes a front or a rear for the vehicle in dependence on a mounting place of the monopulse type radar 51.

In addition to the antennas similar to conventional ones, i.e., in addition to two receiving antennas 62-L, 62-R and a transmitting antenna 61-W (FIG. 6), the monopulse type radar 51 has additionally a transmitting antenna 61-N (FIG. 7) whose half value angle of a directivity is narrower than the transmitting antenna 61-W. That is, the monopulse type radar 51 has the transmitting antenna 61-W whose half value angle of the directivity is θw and the transmitting antenna 61-N whose half value angle of the directivity is θn (θn<θw), and is constituted such that a switching of the transmitting antennas 61-W, 61-N can be freely made.

Incidentally, hereafter, the transmitting antenna 61-W is refereed to as a wide angle transmitting antenna 61-W, and the transmitting antenna 61-N is referred to as as a narrow angle transmitting antenna 61-N.

As shown in FIG. 6, this monopulse type radar 51 first performs a detection (hereafter, refereed to as a wide angle detection) of the detection object near the front center direction by using the wide angle transmitting antenna 61-W. More accurately, as mentioned later, since an actual detection is performed by using the narrow angle transmitting antenna 61-N, it follows that, in a wide angle detection, there is judged an existence/nonexistence of an existence possibility of the detection object near the front center direction.

For example, in the wide angle detection of the present embodiment, a reception signal is received to the receiving antennas 62-L, 62-R and, in a case where a detection angle of the monopulse type with respect to that reception signal is equal to or below a threshold value (e.g., an angle smaller than θn in FIG. 7), it is judged that there is the existence possibility of the detection object near the front center direction. In contrast to this, in a case other than that, i.e., in a case where the reception signal is not received to the receiving antennas 62-L, 62-R or in a case where, even if the reception signal is received, a monopulse type detection angle with respect to that reception signal exceeds the threshold value, it is judged that the there is no existence possibility of the detection object near the front center direction.

However, the wide angle detection is not limited to the specific embodiments described above, and there may be other embodiments if utilizing the monopulse type. For example, in a case where the monopulse type radar 51 can measure not only the angle of the detection object but also its relative velocity and distance, it is also possible, when there is constituted for instance like FIG. 10 mentioned later, that the existence/nonexistence of the existence possibility of the detection object near the front center direction is determined by considering not only the angle but also the relative velocity and distance.

In a case where the existence possibility of the detection object near the front center direction has been detected by the wide angle detection like this, the monopulse type radar 51 additionally performs a detection (hereafter, refereed to as a narrow angle detection) of the detection object near the front center direction by using the narrow angle transmitting antenna 61-N as shown in FIG. 7.

In the narrow angle detection of the present embodiment, the above-mentioned wide angle detection or a similar detection method may be utilized. That is, in the narrow angle detection of the present embodiment, the reception signal is received to the receiving antennas 62-L, 62-R and, in a case where the monopulse type detection angle with respect to that reception signal is equal to or below a threshold value (e.g., in the present embodiment, the same angle as the threshold value of the wide angle detection), there is judged that the detection object near the front center direction has been detected. In contrast to this, in the case other than that, i.e., in the case where the reception signal is not received to the receiving antennas 62-L, 62-R or in the case where, even if the reception signal is received, the monopulse type detection angle with respect to that reception signal exceeds the threshold value, there is judged that the detection object near the front center direction is not detected.

However, the narrow angle detection is not limited to the specific embodiments described above, and there may be other embodiments if utilizing the monopulse type. For example, since the wide angle detection itself finishes, it is also possible to adopt such a technique that, merely by the existence/nonexistence of the reception signal, there is determined an existence/nonexistence of the detection of the detection object near the front center direction. Further, for example, in the case where the monopulse type radar 51 can measure not only the angle of the detection object but also its relative velocity and distance, it is also possible, in the case where there is constituted for instance like FIG. 10 mentioned later, that the existence/nonexistence of the detection of the detection object near the front center direction is determined by considering not only the angle but also the relative velocity and distance.

Further, in one or more embodiments of the present invention, the threshold value utilized in the wide angle detection and the threshold value utilized in the narrow angle detection are made the same angle. However, it is also possible that the threshold values of both adopt respectively separate angles.

Like this, when the detection object near the front center direction has been detected by the wide angle detection, the monopulse type radar 51 performs additionally the narrow angle detection without the wide angle detection being made a final detection result and, also in the narrow angle detection, when the detection object near the front center direction has been detected, that detection is adopted for the first time as the final detection result. By this, it becomes possible to obtain a more accurate final detection result.

In other words, hitherto, there has been performed only the wide angle detection mentioned here, and its detection result has been adopted intact as the final detection result. However, as mentioned above, a specification as to whether the detection result of the wide angle like that is the correct detection result because the detection object in the front actually exists, or the error detection result due to objects to the front-left and front-right of the radar has been difficult. Especially, when relative velocities of the objects to the front-left and front-right of the radar are the same, the specifications thereof become very difficult.

In contrast to this, by the fact that the monopulse type radar 51 utilizes a detection result of the narrow angle detection, it becomes possible to accurately specify whether a detection result of the wide angle has been the correct detection result because the detection object in the front actually exists, or has been the error detection result due to objects to the front-left and front-right of the radar.

Figure 5:
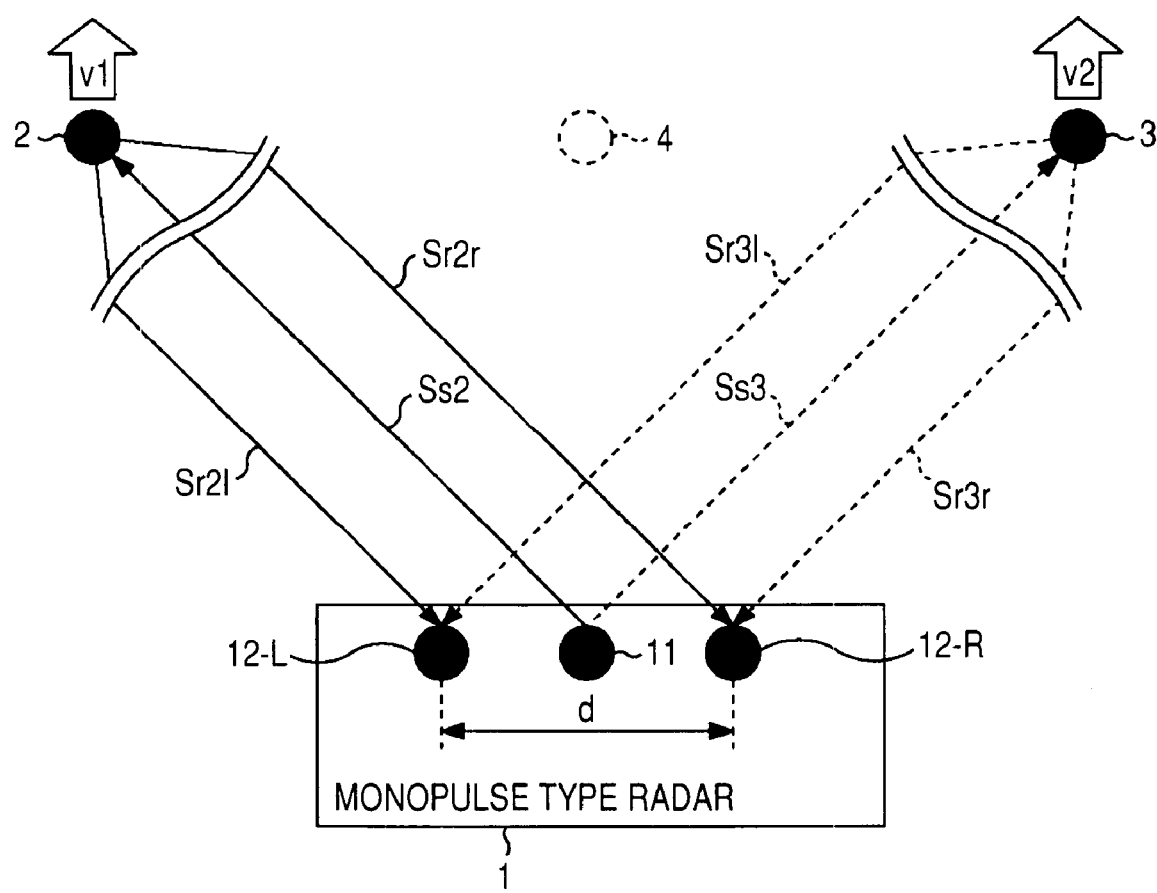
FIG. 5 is a view explaining an issue that a conventional monopulse type radar has.

Concretely, as shown in FIG. 6 for instance, in such a case that, besides the detection object 2 exists in the front-left, the detection object 3 additionally exists in the front-right, if the wide angle detection using the wide angle antenna 61-W is performed, it follows that the angle near 0 degree is detected as having been mentioned above by using FIG. 5. As a result, notwithstanding the fact that nothing actually exists near the front center direction, there is detected as if the detection object 4 exists. That is, there is detected the detection object 4 which is merely the phantom.

Whereupon, in the case like this, as shown in FIG. 7, the monopulse type radar 51 performs additionally the narrow angle detection using the narrow angle antenna 61-N. At this time, irrespective of the relative velocity v1 of the detection object 2 and the relative velocity v2 of the detection object 3, i.e., even when the relative velocity v1 and the relative velocity v2 are the same, since the transmission signal from the narrow angle antenna 61-N does not reach to the detection object 2 and the detection object 3, the reception signal becomes not received to the receiving antennas 62-L, 62-R. As a result, irrespective of the relative velocity v1 of the detection object 2 and the relative velocity v2 of the detection object 3, i.e., even when the relative velocity v1 and the relative velocity v2 are the same, it becomes possible that the monopulse type radar 51 judges that the detection object does not exist near the front center direction, i.e., judges that the detection object 4 having been detected in the wide angle detection has been merely the phantom.

In contrast to this, although not shown in the drawing, in a case where an actual detection object exists near the front center direction, also the transmission signal from the wide angle antenna 61-W and also the transmission signal from the narrow angle antenna 61-N reach to that detection object. As a result, it follows that, also in the wide angle detection and also in the narrow angle detection, that actual detection object is detected.

Figure 8:
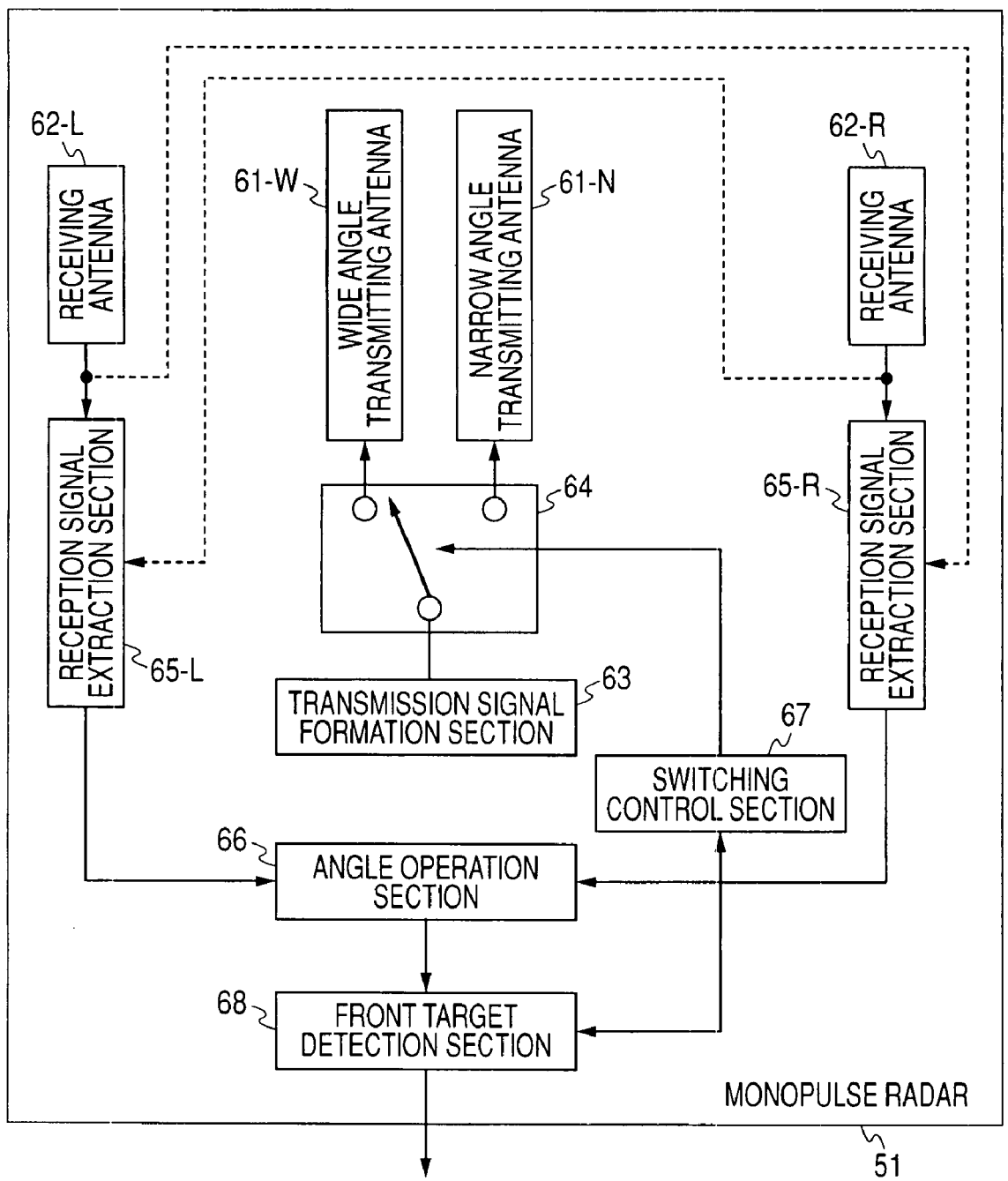
FIG. 8 is a function block diagram showing a functional constitution example of a monopulse type radar to which one or more embodiments of the present invention is applied.

A function block diagram showing a function of the monopulse type radar 51 to which one or more embodiments of the present invention has been applied is shown in FIG. 8.

In the monopulse type radar 51 of an example of FIG. 8, there are provided the above-mentioned antennas, i.e., the wide angle transmitting antenna 61-W, the narrow angle transmitting antenna 61-N, the receiving antenna 62-L, and the receiving antenna 62-R. Additionally, in the monopulse type radar 51, there are provided a transmission signal formation section 63 to a front target detection section 68.

The transmission signal formation section 63 forms the transmission signal and provides it to a switching section 64.

A form of the transmission signal formed by the transmission signal formation section 63 is not limited especially if it is a form capable of being transmitted from the wide angle transmitting antenna 61-W and the narrow angle transmitting antenna 61-N. About a concrete example of the transmission signal, there is mentioned later by referring to FIG. 10.

The switching section 64 switches, on the basis of a control of a switching control section 67 mentioned later, an output destination of the transmission signal from the transmission signal formation section 63 to any one side between a wide angle transmitting antenna 61-W side and a narrow angle transmitting antenna 61-N side.

That is, in a case where the output destination of the switching section 64 is switched to the wide angle transmitting antenna 61-W side, the transmission signal from the transmission signal formation section 63 is outputted from the wide angle transmitting antenna 61-W, and there is performed the wide angle detection having been mentioned above by using FIG. 6.

On the other hand, in a case where the output destination of the switching section 64 is switched to the narrow angle transmitting antenna 61-N side, the transmission signal from the transmission signal formation section 63 is outputted from the narrow angle transmitting antenna 61-N, and there is performed the narrow angle detection having been mentioned above by using FIG. 7.

The transmission signal from the wide angle transmitting antenna 61-W or the narrow angle transmitting antenna 61-N reflects, in a case where the detection object exists, in that detection object, and its reflection signal is received to each of the receiving antennas 62-L, 62-R as the reception signal.

In a case where the monopulse type radar 51 adopts a phase monopulse type, a reception signal extraction section 65-L extracts the reception signal having been received to the receiving antenna 62-L as shown by a solid line in the drawing and, additionally in compliance with a necessity, suitably converts it into other form capable of being utilized in an angle operation section 66 mentioned later, thereby providing it to the angle operation section 66 as an output signal. Further, a reception signal extraction section 65-R extracts the reception signal having been received to the receiving antenna 62-R and, additionally in compliance with a necessity, suitably converts it into other form capable of being utilized in the angle operation section 66 mentioned later, thereby providing it to the angle operation section 66 as an output signal.

On the other hand, in a case where the monopulse type radar 51 adopts an amplitude monopulse type, the reception signal extraction section 65-L extracts an addition signal of the reception signal having been received to the receiving antenna 62-L and the reception signal having been received to the receiving antenna 62-R as shown by the solid line and a dotted line in the drawing and, additionally in compliance with a necessity, suitably converts it into a form capable of being utilized in the angle operation section 66 mentioned later, thereby providing it to the angle operation section 66 as an output signal. Further, the reception signal extraction section 65-R extracts a difference signal between the reception signal having been received to the receiving antenna 62-L and the reception signal having been received to the receiving antenna 62-R and, additionally in compliance with a necessity, suitably converts it into a form capable of being utilized in the angle operation section 66 mentioned later, thereby providing it to the angle operation section 66 as an output signal.

By utilizing each output signal of the reception signal extraction sections 65-R, 65-L, the angle operation section 66 operates an angle in compliance with the phase monopulse type or the amplitude monopulse type. An operation result of the angle operation section 66 is notified to the front target detection section 68.

The switching control section 67 performs a control switching the output destination of the switching section 64 in compliance with a switching command from the front target detection section 68 mentioned later.

On the basis of the angle having been notified from the angle operation section 66, the front target detection section 68 performs the wide angle detection or the narrow angle detection, which has been mentioned above. And, in the narrow angle detection after the wide angle detection, when there has been judged that the detection object near the front center direction has been detected, the front target detection section 68 outputs a signal showing that detection to an outside. Further, when there is switched from the wide angle detection to the narrow angle detection or when there is switched from the narrow angle detection to the wide angle detection, the front target detection section 68 issues the switching command to the switching control section 67. Incidentally, hereafter, the signal outputted from the front target detection section 68 is referred to as a target detection signal. Further, following upon this naming, the detection object near the front center direction is referred to also as a front target.

Incidentally, the switching control section 67 and the front target detection section 68 can be omitted. That is, in the monopulse type radar 51, it is possible to exclusively perform only the angle detection. However, in this case, as to functions that the switching control section 67 and the front target detection section 68 have, it is necessary to transfer them to an outside signal processing device and the like, which are not shown in the drawing.

Figure 9:
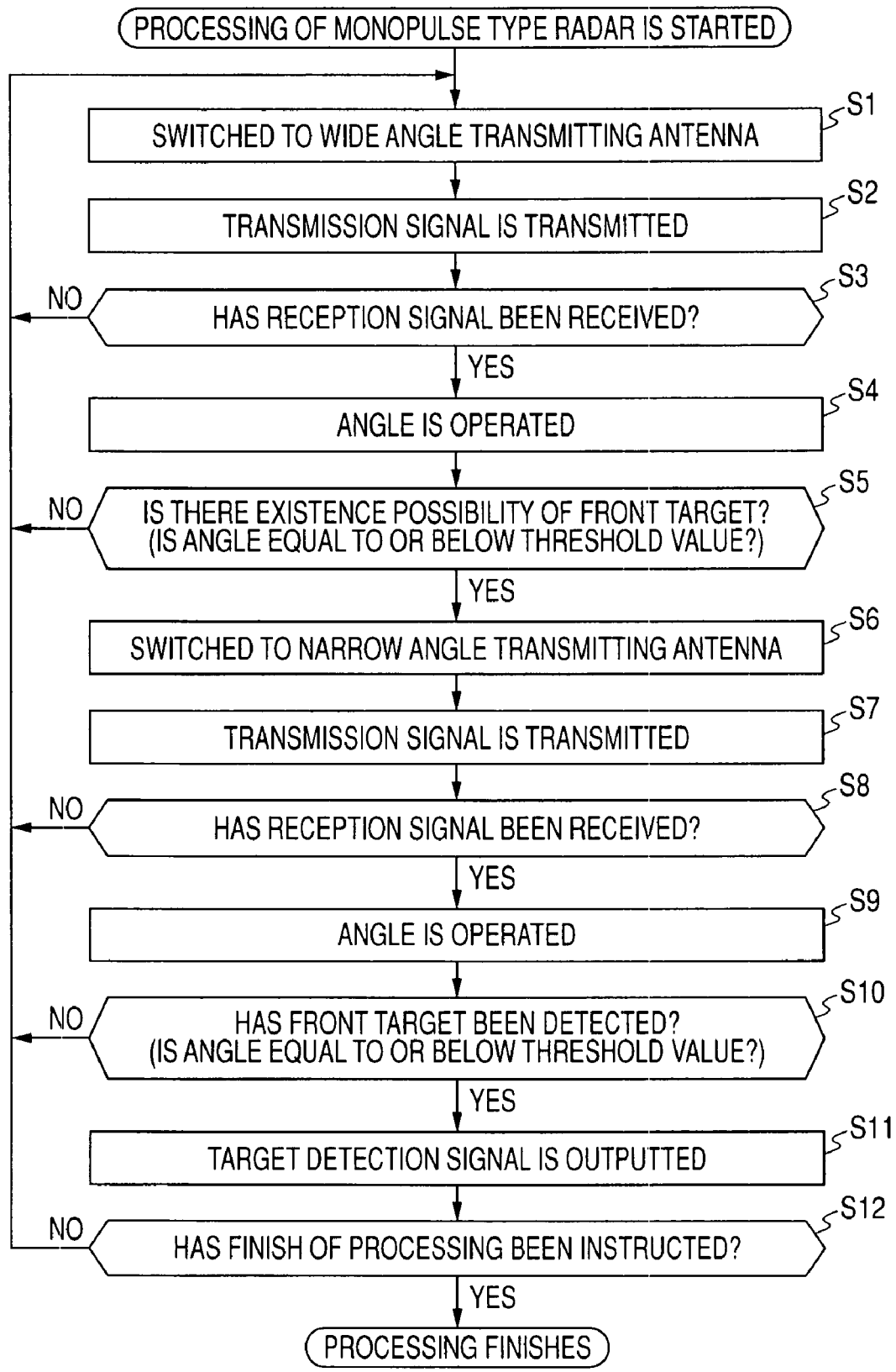
FIG. 9 is a flowchart explaining a processing example of the monopulse type radar of FIG. 8.

A processing example of the monopulse type radar 51 having such a functional constitution of FIG. 8 is shown in a flowchart of FIG. 9.

In a step S1 of FIG. 9, the switching section 64 witches its output destination to the wide angle transmitting antenna 61-W side on the basis of the control of the switching control section 67.

In a step S2, the wide angle transmitting antenna 61-W transmits the transmission signal having been provided from the transmission signal formation section 63 through the switching section 64.

In a step S3, the angle operation section 66 judges whether or not the reception signal has been received.

During each output signal of the reception signal extraction sections 65-L, 65-R is not provided, in the step S3, there is judged that the reception signal is not received, the processing is returned to the step S1, and the processing after that is repeated. Incidentally, in this case, since the output destination of the switching section 64 is already switched to the wide angle transmitting antenna 61-W side, the processing of the step S1 is not implemented substantially, and the processing proceeds to the step S2.

Thereafter, in a case where the detection object such as other vehicle has entered by one or more into a range of ±θw in FIG. 6, the transmission signal having been transmitted by the processing of the step S2 reflects respectively in one or more detection object(s), and the respective refection signals are received to the receiving antennas 62-L, 62-R. Whereon, as having been mentioned above, each output signal of the reception signal extraction sections 65-L, 65-R is provided to the angle operation section 66. Thereupon, in a step S4, the angle operation section 66 operates the angle in compliance with the phase monopulse type or the amplitude monopulse type by using each output signal of the reception signal extraction sections 65-L, 65-R, thereby notifying its operation result to the front target detection section 68.

In a step S5, on the basis of the angle having been notified from the angle operation section 66, the front target detection section 68 judges whether or not there is the existence possibility of the front target. As having been mentioned above, in the present embodiment, on the basis of whether or not the angle having been notified from the angle operation section 66 is equal to or below a threshold value (e.g., an angle smaller than θn in FIG. 7), the front target detection section 68 judges whether or not there is the existence possibility of the front target.

In the step S5, in a case where there has been judged that there is no existence possibility of the front target, i.e., in a case where, in the present embodiment, the angle exceeds the threshold value, the processing is returned to the step S1, and the processing after that is repeated. Incidentally, in this case, since the output destination of the switching section 64 is already switched to the wide angle transmitting antenna 61-W side, the processing proceeds to the step S2 without the processing of the step S1 being implemented substantially.

In contrast to this, in a case where, in the step S5, there has been judged that there is the existence possibility of the front target, i.e., in a case where, in the present embodiment, the angle is equal to or below the threshold value, the switching command is issued to the switching control section 67 from the front target detection section 68, and the processing proceed to a step S6.

In the step S6, on the basis of the control of the switching control section 67 which has received the switching command, the switching section 64 switches its output destination to the narrow angle transmitting antenna 61-N side.

In a step S7, the narrow angle transmitting antenna 61-N transmits the transmission signal having been provided from the transmission signal formation section 63 through the switching section 64.

In a step S8, the angle operation section 66 judges whether or not the reception signal has been received.

Concretely, although an illustration such as arrow does not exist in FIG. 8, it is made that the angle operation section 66 can obtain a transmission timing of the transmission signal in the step S7 from the transmission signal formation section 63 for instance. In this case, when each output signal of the reception signal extraction sections 65-L, 65-R is not provided even if a predetermined time has elapsed from that transmission timing, the angle operation section 66 judges, in the step S8, that the reception signal is not received. Whereon, that judgment result is notified to the front target detection section 68 and, by receiving that notification, the switching command is issued to the switching control section 67 from the front target detection section 68 and the processing is returned to the step S1. And, in the step S1, the output destination of the switching section 64 is switched to the wide angle transmitting antenna 61-W side, and the processing after the step S2 is implemented.

In contrast to this, when each output signal of the reception signal extraction sections 65-L, 65-R is provided before the predetermined time elapses from the transmission timing of the transmission signal, the angle operation section 66 judges, in the step S8, that the reception signal has been received. And, in a step S9, the angle operation section 66 operates the angle in compliance with the phase monopulse type or the amplitude monopulse type by using each output signal of the reception signal extraction sections 65-L, 65-R, thereby notifying its operation result to the front target detection section 68.

In a step S10, on the basis of the angle having been notified from the angle operation section 66, the front target detection section 68 judges whether or not the front target has been detected. As having been mentioned above, in the present embodiment, on the basis of whether or not the angle having been notified from the angle operation section 66 is equal to or below the threshold value, the front target detection section 68 judges whether or not the front target has been detected.

Incidentally, as has been mentioned above, in the present embodiment, although the threshold value utilized in the processing of the step S10 is made the same angle as the threshold value utilized in the processing of the step S5, it is also possible to adopt respectively separate angles.

In a case where, in the step S10, there has been judged that the front target has not been detected, i.e., in a case where, in the present embodiment, the angle exceeds the threshold value, the switching command is issued to the switching control section 67 from the front target detection section 68, and the processing is returned to the step S1. And, in the step S1, the output destination of the switching section 64 is switched to the wide angle transmitting antenna 61-W side, and the processing after the step S2 is implemented.

In contrast to this, in a case where, in the step S10, there has been judged that the front target has been detected, i.e., in a case where, in the present embodiment, the angle is equal to or below the threshold value, the front target detection section 68 outputs the target detection signal in a step S11.

In a step S12, the front target detection section 68 judges whether or not a finish of the processing has been instructed.

In a case where, in the step S12, there has been judged that the finish of the processing has been instructed, the processing of the monopulse type radar 51 becomes the finish.

In contrast to this, in a case where, in the step S12, there has been judged that the finish of the processing is not instructed yet, the switching command is issued to the switching control section 67 from the front target detection section 68, and the processing is returned to the step S1. And, in the step S1, the output destination of the switching section 64 is switched to the wide angle transmitting antenna 61-W side, and the processing after the step S2 is implemented.

Like this, when the monopulse type radar 51, to which the invention has been applied, has detected the front target in the wide angle detection, it does not output immediately the target detection signal and judges that the detection concerned merely shows the existence possibility, thereby performing additionally the narrow angle detection. And, when the monopulse type radar 51 has detected the front target also in that narrow angle detection, for the first time it outputs the target detection signal.

That is, by performing the narrow angle detection, the monopulse type radar 51 judges whether the wide angle detection having been performed before the narrow angle detection has been the correct detection because the front target actually exists, or has been the error detection due to objects to the front-left and front-right of the radar. And, when the monopulse type radar 51 has judged that it has been the correct detection, for the first time it outputs the target detection signal.

By this, in a signal processing section, not shown in the drawing, performing a processing avoiding the collision between the vehicle and the other vehicle by utilizing this target detection signal, it becomes possible to actually implement that processing. That is, it can markedly reduce the erroneous detection of the collision or the like.

By the way, a series of the above-mentioned processings (or the processing of one portion among them), e.g., the processing having complied with the above-mentioned flowchart of FIG. 9, can be implemented also by a hardware, or also by a software.

Figure 10:
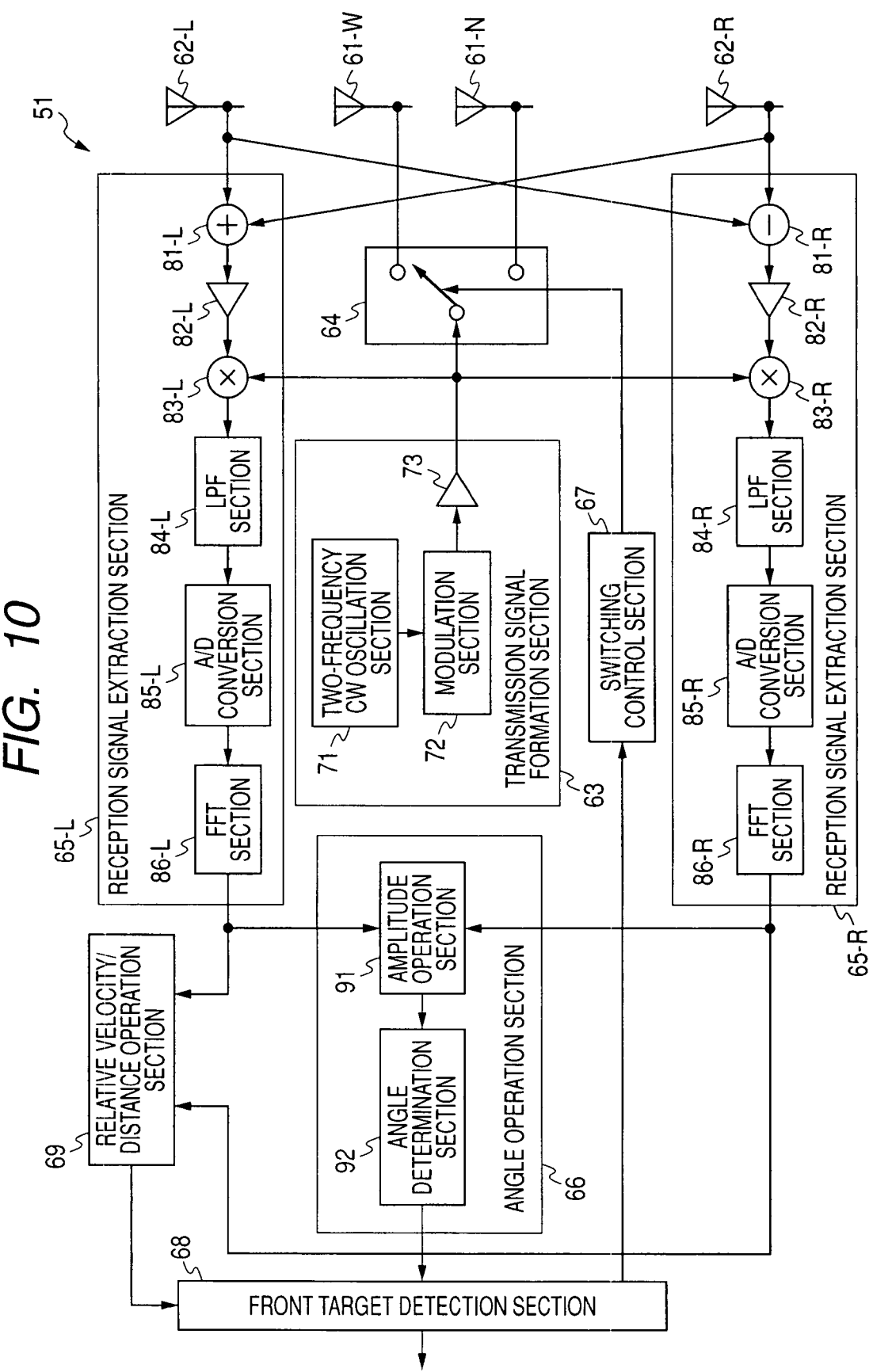
FIG. 10 is a block diagram showing a hardware constitution example of the monopulse type radar to which one or more embodiments of the present invention is applied.

In a case where the series of the processings (or the processing of one portion among them) are implemented by the hardware, the monopulse type radar 51 can be constituted as shown in FIG. 10 for instance. That is, FIG. 10 shows a hardware constitution example of the monopulse type radar 51 in which the amplitude monopulse type has been adopted.

In the example of FIG. 10, there is constituted such that the transmission signal formation section 63 includes a two-frequency CW oscillation section 71, a modulation section 72, and an amplification section 73.

The two-frequency CW oscillation section 71 oscillates a signal (hereafter, referred to as a two-frequency CW), which is obtained as a result of the fact that, e.g., a CW (Continuous Wave) of a frequency f1 and a CW of a frequency f2 have been switched by a time division, as a carrier wave, and provides it to the modulation section 72.

The modulation section 72, e.g., AM (Amplitude Modulation)-modulates the two-frequency CW, and provides a signal obtained as a result to the amplification section 73. Incidentally, the AM is merely an exemplification, and a modulation system by the modulation section 72 may be arbitrary.

The amplification section 73 suitably applies various processings such as amplification processing to the two-frequency CW having been modulated by the modulation section 72, and provides a signal obtained as a result to the switching section 64 as an output signal. This output signal of the amplification section 73 is provided to the wide angle transmitting antenna 61-W or the narrow angle antenna 61-N through the switching section 64, and outputted in the form of a radio wave as the transmission signal.

This transmission signal reflects in the detection object, and that reflection signal is received to each of the receiving antennas 62-L, 62-R as the reception signal, and provided to both of the reception signal extraction sections 65-L, 65-R.

Such a reception signal extraction section 65-L is constituted so as to include an addition signal formation section 81-L, an amplification section 82-L, a mixing section 83-L, an LPF section 84-L, an A/D conversion section 85-L, and an FFT section 86-L.

The addition signal formation section 81-L forms an addition signal of the reception signal having been received to the receiving antenna 62-L and the reception signal having been received to the receiving antenna 62-R, and provides it to the amplification section 82-L.

The amplification section 82-L suitably applies various processings such as amplification processing to the addition signal from the addition signal formation section 81-L, and provide a signal obtained as a result to the mixing section 83-L as an output signal.

The mixing section 83-L mixes the output signal of the amplification section 82-L and the transmission signal from the transmission signal formation section 63, and provides a signal obtained as a result to the LPF section 84-L as an output signal. The LPF section 84-L applies an LPF (Low Pass Filter) processing to the output signal of the mixing section 83-L, and provides a signal obtained as a result to the A/D conversion section 85-L as an output signal. The A/D conversion section 85-L applies an A/D conversion (Analog to Digital) processing to the output signal of the LPF section 84-L, and provides a digital signal obtained as a result to the FFT section 86-L as an output signal.

The FFT section 86-L applies an FFT (Fast Fourier Transform) analysis processing to the output signal, i.e., a digital addition signal, of the A/D conversion section 85-L, and provides an FFT analysis result of its addition signal to the angle operation section 66 and a relative velocity/distance operation section 69.

In contrast to the reception signal extraction section 65-L of the constitution like this, the reception signal extraction section 65-R is constitutes as follows. That is, the reception signal extraction section 65-R is constituted so as to include a difference signal formation section 81-R, an amplification section 82-R, a mixing section 83-R, an LPF section 84-R, an A/D conversion section 85-R, and an FFT section 86-R.

The difference signal formation section 81-R forms a difference signal between the reception signal having been received to the receiving antenna 62-L and the reception signal having been received to the receiving antenna 62-R, and provides it to the amplification section 82-R.

Each of the amplification section 82-R, the mixing section 83-R, the LPF section 84-R, the A/D conversion section 85-R, and the FFT section 86-R has a constitution and a function, which are basically similar to each of the amplification section 82-L, the mixing section 83-L, the LPF section 84-L, the A/D conversion section 85-L, and the FFT section 86-L, which have been mentioned above. Accordingly, there is omitted about an individual explanation of each part of them.

From the reception signal extraction section 65-R of the constitution like this, eventually, there is outputted an FFT analysis result of the difference signal, and it is provided to the angle operation section 66 and the relative velocity/distance operation section 69.

By doing like this, to the angle operation section 66, there is respectively provided each FFT analysis result of the addition signal and the difference signal. Concretely, in the example of FIG. 10, the angle operation section 66 is constituted so as to include an amplitude operation section 91 and an angle determination section 92. Between them, to the amplitude operation section 91, there is respectively provided each FFT analysis result of the addition signal and the difference signal.

On the basis of each FFT analysis result of the addition signal and the difference signal, the amplitude operation section 91 operates the ratio between the signal intensities of both of the addition signal and the difference signal, which has been mentioned above by using FIG. 4, and provides its operation result to the angle determination section 92.

Figure 1:
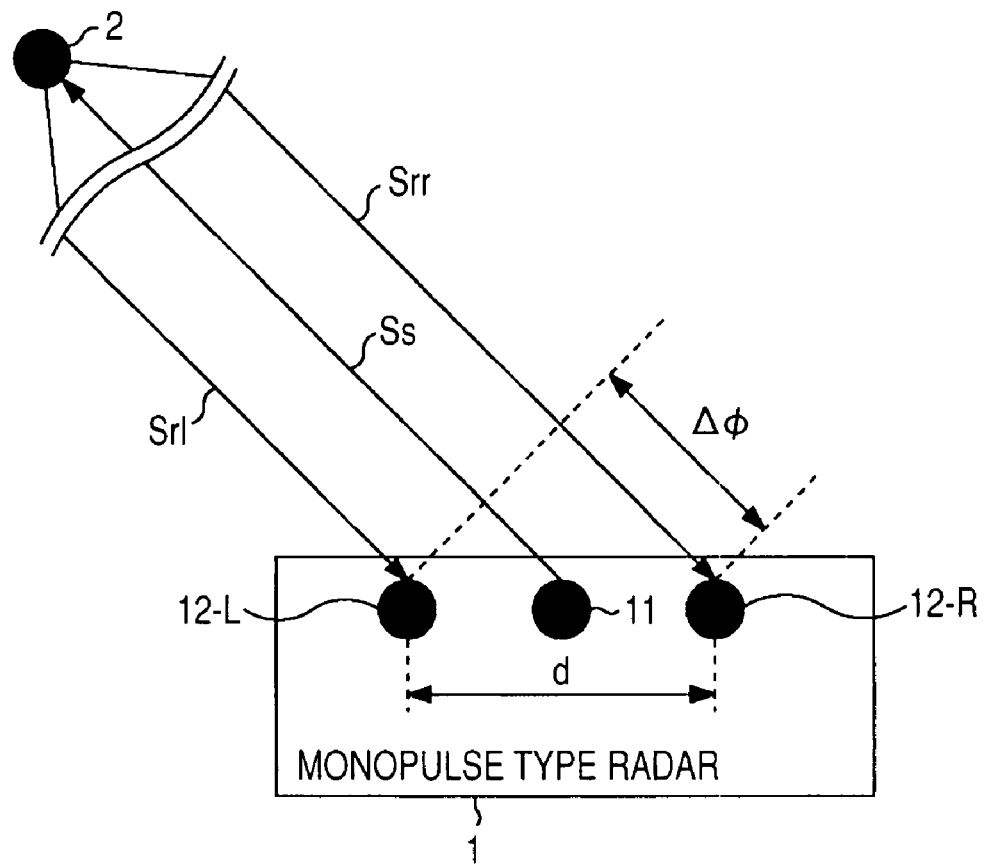
FIG. 1 is a view explaining a monopulse type radar.
Figure 2:
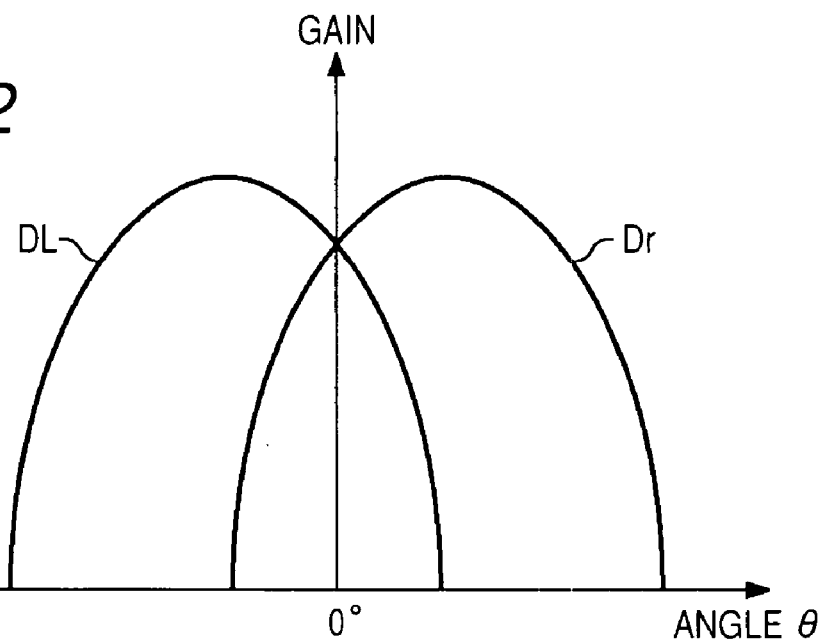
FIG. 2 is a view explaining the monopulse type radar.
Figure 3:
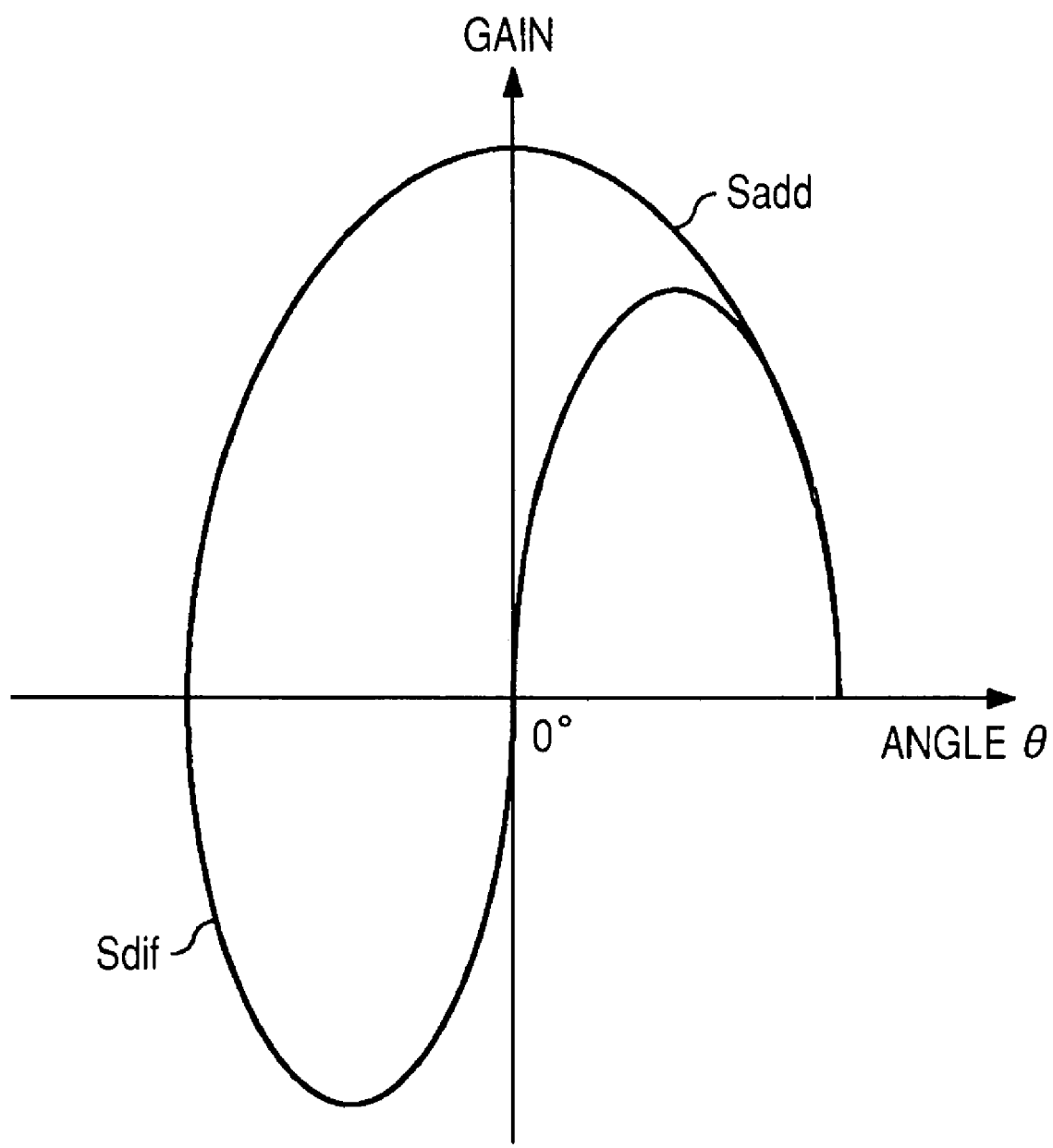
FIG. 3 is a view explaining the monopulse type radar.
Figure 4:
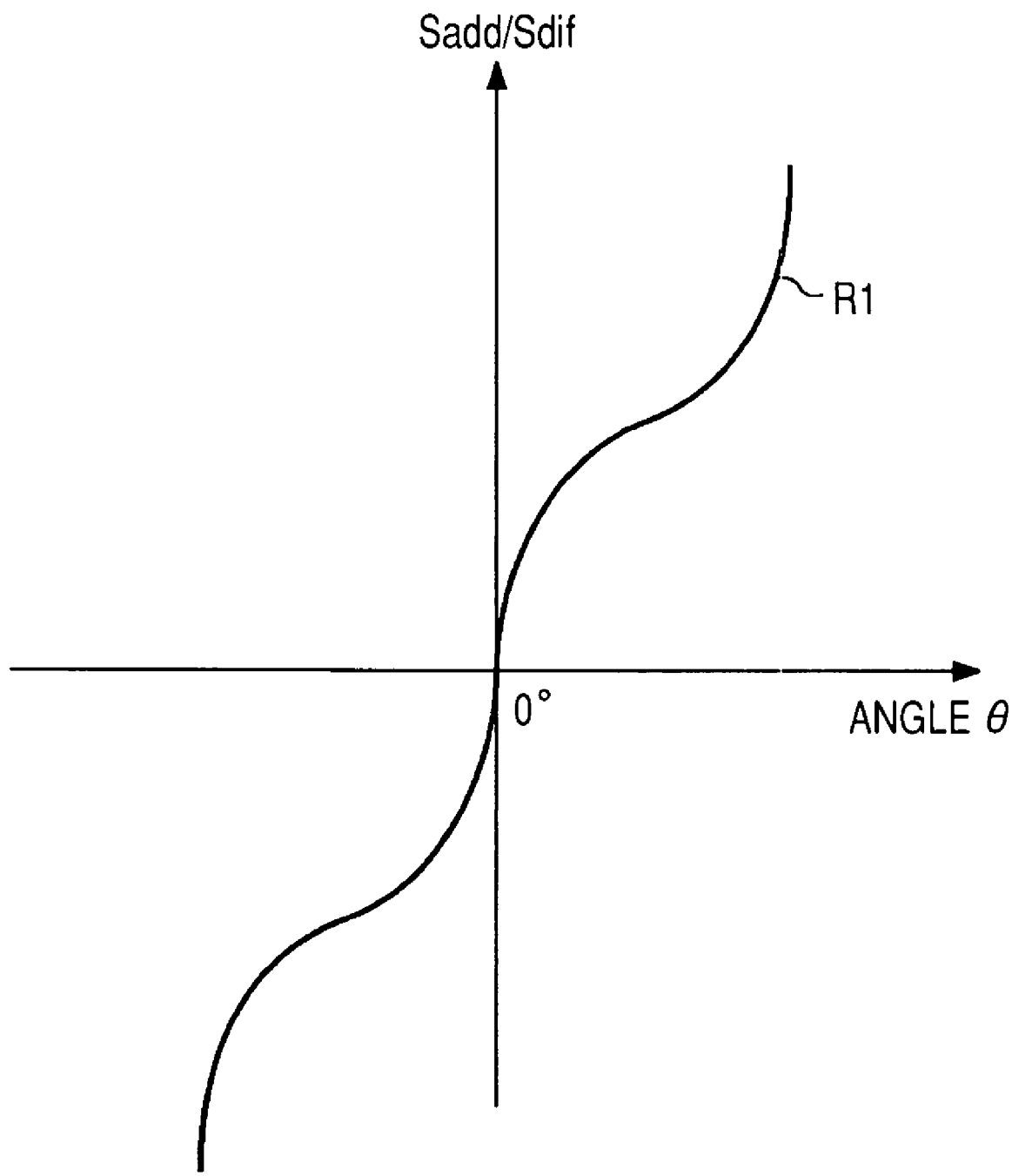
FIG. 4 is a view explaining the monopulse type radar.

The angle determination section 92 previously retains a data of the gain characteristic of FIG. 4 for instance, determines an angle by comparing that data of FIG. 4 and an operation result of the amplitude operation section 91, and provides that angle to the front target detection section 68.

Further, in the example of FIG. 10, the relative velocity/distance operation section 69 is provided as well, and each FFT analysis result of the addition signal and the difference signal is provided also to this relative velocity/distance operation section 69. Thereupon, by utilizing each FFT analysis result of the addition signal and the difference signal, the relative velocity/distance operation section 69 operates at least one between a relative velocity to and a relative distance from the detection object, and provides its operation result to the front target detection section 68.

Incidentally, in the present embodiment, the relative velocity/distance operation section 69 is made to operate both of the relative velocity to and the relative distance from the detection object. Although operating the relative velocity to and the relative distance from the detection object in this case is not limited to examples given here, for example, an operation technique by a two-frequency CW system like the below can be applied.

That is, in the example of FIG. 10, as to the carrier wave of the transmission signal, as mentioned above, there is adopted the two-frequency CW in which the frequencies f1 and f2 are switched by the time division. That is, it may be said that, in the example of FIG. 10, the transmission signal has the two frequencies f1, f2.

Although there becomes a repetition, this transmission signal reflects in the detection object, and its reflection signal is received to the monopulse type radar 51 as the reception signal.

At this time, if a relative velocity v exists between the monopulse type radar 51 and the detection object, each of Doppler frequencies $\Delta f1$, $\Delta f2$ generates for each of the frequencies f1, f2 of the transmission signal and, as a result, the frequency of the reception signal becomes each of frequencies of $f1+\Delta f1$, $f2+\Delta f2$.

In other words, a signal obtained as a result of the fact that the two-frequency CW having the two frequencies $f1+\Delta f1$, $f2+\Delta f2$ has been modulated as the carrier wave becomes a signal equivalent to the reception signal.

Thereupon, the relative velocity/distance operation section 69 calculates the Doppler frequency $\Delta f1$ or $\Delta f2$ from each FFT analysis result of the addition signal and the difference signal and, by performing an operation of the following expression (2) or (3), it is possible to find the relative velocity v to the monopulse type radar 51 and the detection object.

$$v = c^* \Delta f1 / (2^* f1) \quad (2)$$

$$v = c^* \Delta f2 / (2^* f2) \quad (3)$$

Incidentally, c denotes a light velocity.

Further, the relative velocity/distance operation section 69 calculates a difference between a phase $\Delta \phi 1$ of the Doppler signal of the Doppler frequency $\Delta f1$ and a phase $\Delta \phi 2$ of the Doppler signal of the Doppler frequency Δf2, i.e., a phase difference Δϕ1-Δϕ2, from each FFT analysis result of the addition signal and the difference signal and, by performing an operation of the following expression (4), it is possible to find a distance L between the monopulse type radar 51 and the detection object.

$$L = c^* (\Delta\phi1 - \Delta\phi2)/4\pi^*(f1 - f2) \quad (4)$$

The operation technique like this is an operation technique by the two-frequency CW system.

An operation result of the relative velocity/distance operation section 69 to which the operation technique by the two-frequency CW system like this has been applied, i.e., the relative velocity to or the relative distance from the detection object, is provided to the front target detection section 68. Accordingly, by considering, besides the angle from the angle operation section 66, additionally the relative velocity and the relative distance, the front target detection section 68 can judge an existence/nonexistence of the detection of the front target.

That is, in the example of FIG. 10, as a judgment reference of the processing in the step S5 of the example of FIG. 9, it becomes possible not only to judge whether or not the angle is equal to or below the threshold value but also to utilize at least one between the relative velocity and the relative distance. Similarly, as a judgment reference of the processing in the step S10 of the example of FIG. 9, it becomes possible not only to judge whether or not the angle is equal to or below the threshold value but also to utilize at least one between the relative velocity and the relative distance.

Like this, since the front target detection section 68 in the example of FIG. 10 can perform the detection of the front target, which has considered not only the angle but also the relative velocity and the relative distance, it becomes possible to more accurately output a target detection signal.

In the above, there has been explained about one embodiment in the case where the above-mentioned series of processings (or the processing of one portion among them) are implemented by the hardware.

On the other hand, in a case where the above-mentioned series of processings (or the processing of one portion among them) are implemented by the software, the monopulse type radar 51 or its one portion can be constituted by such a computer as shown in FIG. 11 for instance.

In FIG. 11, a CPU (Central Processing Unit) 101 implements various processings in compliance with a program recorded in a ROM (Read Only Memory) 102, or a program having been loaded to a RAM (Random Access Memory) 103 from a storage section 108. In the RAM 103, there are further stored suitably a data necessary for the CPU 101 to implement the various processings, and the like as well.

The CPU 101, the ROM 102 and the RAM 103 are mutually connected trough a bus 104. To this bus 104, further there is connected an input/output interface 105 as well.

To the input/output interface 105, there are connected an input section 106 comprising a keyboard, a mouse and the like, an output section 107 comprising a display and the like, the storage section 108 composed of a hard disk and the like, and a communication section 109 composed of a modem, a terminal adapter and the like. The communication section 109 performs a communication processing with other device through a network including the Internet. Furthermore, the communication section 109 performs also a transmission/reception processing for transmitting the transmission signal from the wide angle antenna 61-W or the narrow angle antenna 61-N, and receiving the reception signal with respect to that transmission signal to the receiving antennas 62-L, 62-R.

To the input/output interface 105, there is further connected a drive 110 in compliance with a necessity, and there is suitably mounted removable media 111 comprising a magnetic disk, an optical disk, a photomagnetic disk, a semiconductor memory, or the like, and a computer program having been read from them is installed to the storage section 108 in compliance with a necessity.

In the case where the series of processings are implemented by the software, a program constituting that software is installed from the network or a recording medium to a computer incorporated in an exclusive hardware, or, e.g., a general purpose personal computer capable of implementing various functions by installing various programs, and the like.

As shown in FIG. 11, the recording medium including the program like this is constituted not only by the removable media (package media) 111 distributed separately from a device main body in order to provide the program to a user, and comprising the magnetic disk (including a floppy disk), the optical disk (including a CD-ROM (Compact Disk-Read Only Memory), a DVD (Digital Versatile Disk)), the photomagnetic disk (including an MD (Mini-Disk)), the semiconductor memory, or the like, in which the program has been recorded, and constituted but also by the ROM 102, the hard-disk included in the storage section 108, or the like, which is provided to the user under a state being previously incorporated in the device main body, and in which the program is recorded.

Incidentally, in the present specification, a step describing the program recorded to the recording medium is one including of course a processing performed in a time series along its sequence, and also a processing implemented in parallel or individually although not processed necessarily in the time series.

Further, the invention can be applied to devices or systems of various constitutions, not only to the above-mentioned monopulse type radar 51. Incidentally, here, the system is one denoting the whole device constituted by plural processing devices or processing sections.

That is, in one or more embodiments of the invention, explained above, an assumption of the application to the monopulse type radar in order to facilitate a comparison with the conventional monopulse type radar. In one or more embodiments of the present invention, it possible to accurately specify, when the object in front of the radar has been detected, whether that detection is the correct detection because the front object actually exists, or the error detection due to objects to the front-left and front-right of the radar.

In one or more embodiments of the present invention, a radar device for detecting an object in front of the radar device comprises a plurality of antennas, a position specification means, and an object detection means. The object is detected based on reception signals received by two or more of the plurality of antennas. A position specification means specifies a position of the object by using each reception signal received by the two or more of the plurality of antennas. An object detection means confirms an existence of the object if the position specified by the position specification means is in a predetermined range. Although the use of a monopulse type radar has been assumed, the invention is not limited thereto.

Accordingly, a radar device to which the invention is applied can be realized, e.g., also as such a device as mentioned below, besides the above-mentioned monopulse type radar 51.

That is, the above-mentioned monopulse type radar 51 has operated the angle in compliance with the monopulse type using two or more reception signals corresponding to a first transmission signal, and has ascertained the position of the object on the basis of that angle. Further, the monopulse type radar 51 has judged, when that angle is equal to or below a first threshold value, that the position of the object is in the predetermined range, has transmitted a second transmission signal whose directivity is a narrow angle with respect to the above-mentioned first transmission signal, has operated again the angle in compliance with the monopulse type using two or more reception signals corresponding to that second transmission signal, has confirmed, when that angle is equal to or below a second threshold value, that the object exists, and has confirmed that it does not exists in a case other than that.

However, an operation technique of the angle, which is utilized for specifying the position of the object and for confirming its existence, is not limited especially to the monopulse type, and it is possible to adopt, e.g., a CAPON method, a MUSIC method, a SPACE method, etc.

Additionally, a confirmation technique performing the confirmation of the object is not limited especially to the above-mentioned technique using the angle, and it is possible to adopt various techniques.

For example, it is possible to adopt such a confirmation technique that, instead of the narrow angle antenna, there is provided an ultrasonic sensor or the like and, on the basis of its detection signal, the confirmation of the object is performed.

For example, it is possible to adopt such a confirmation technique that, instead of the narrow angle antenna, there is provided a camera photographing the front and, on the basis of an image having been photographed by this camera, the confirmation of the object is performed. Incidentally, the image mentioned here is a concept in a broad sense, which includes not only a still image but also a dynamic image.

Further, for example, it is possible to adopt such a confirmation technique as to control an angle range by generating an effective transmission radio wave output by changing a transmission output. That is, it is possible to adopt such a confirmation technique that while the angle range is widen in a first period corresponding to a period in which the wide angle antenna is used, the angle range is narrowed in a second period corresponding to a period in which the narrow angle antenna is used, and the confirmation of the object is performed in this second period.

For example, it is possible to adopt such a confirmation technique as to control a directivity by using a phase shifter. That is, it is possible to adopt such a confirmation technique that while the directivity is widen in the first period corresponding to the period in which the wide angle antenna is used, the directivity is narrowed in the second period corresponding to the period in which the narrow angle antenna is used, and the confirmation of the object is performed in this second period.

Further, for example, in a distance radar such as a distance measurement radar of the above-mentioned two-frequency CW system, when there are respectively bodies of the same velocity in a short distance and a long distance, their intermediate point is detected as a position of the object body. Thereupon, it is possible to adopt such a confirmation technique that, by changing a transmission electric power of the transmitting antenna, the radio wave is made so as to reach only to a constant range, and there is performed a confirmation as to whether or not the object exists in that range.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A radar device for detecting an object in front of the radar device, comprising:
    a plurality of antennas, wherein the object is detected based on reception signals received by the plurality of antennas;
    a position specification means for specifying a position of the object by using the reception signals received by the plurality of antennas;
    a narrow angle transmission means which, when the position specified by the position specification means is in the predetermined range, transmits a second transmission signal with a directivity of a narrower angle than that of a first transmission signal corresponding to the reception signals used in the position specification means, and
    a confirmation means for confirming the existence of the object based on a reflection signal generated by the second transmission signal from the narrow angle transmission means being reflected by the object.

2. The radar device according to claim 1, wherein the plurality of antennas comprise:
    a first antenna transmitting the first transmission signal, and
    a second antenna as the narrow angle transmission means transmitting the second transmission signal.

3. The radar device according to claim 2, wherein:
    the position specification means operates an angle by a monopulse type and, based on the angle, specifies the position of the object, and
    the confirmation means operates an angle by a predetermined system using the reception signals when the reflection signal generated by the second transmission signal being reflected by the object has been received by each of the plurality of antennas and, based on a result of the confirming means operation, confirms the existence of the object.

4. The radar device according to claim 3, further comprising a switching means which switches, when the position specified by the position specification means is in the predetermined range, an antenna for transmission to the second transmitting antenna, and which switches, after a confirmation of the existence of the object by the confirmation means has finished, the antenna for transmission to the first transmitting antenna.

5. The radar device according to claim 1, further comprising a velocity-distance operation means that operates at least one of a relative velocity to and a relative distance from the detection object by using at least one part within the reception signals received by the plurality of antennas, wherein:
    the position specification means specifies the position of the object by using at least one part within an operation result of the velocity-distance operation means, and
    the confirmation means confirms the existence of the object by using at least one part within the operation result of the velocity-distance operation means.

6. A detection method in a radar device comprising:
    a plurality of antennas, wherein an object in front of the radar device is detected based on reception signals received by the plurality of antennas, the method comprising the steps of:

specifying a position of the object by using the reception signals received by the plurality of antennas, transmitting a second transmission signal with a directivity of a narrower angle than that of a first transmission signal corresponding to the reception signals used in the step of specifying the position of the object when the position specified is in a predetermined range; and confirming an existence of the object based on a reflection signal generated by the second transmission signal being reflected by the object.

* * * * *